(12) United States Patent
Lee

(10) Patent No.: US 12,335,568 B2
(45) Date of Patent: Jun. 17, 2025

(54) SET-TOP BOX AND SYSTEM FOR PROVIDING STANDBY POWER CUTOFF SERVICE USING THE SAME

(71) Applicant: Yeon Jae Lee, Uijeongbu-si (KR)

(72) Inventor: Yeon Jae Lee, Uijeongbu-si (KR)

( * ) Notice: Subject to any disclaimer, the term of this patent is extended or adjusted under 35 U.S.C. 154(b) by 87 days.

(21) Appl. No.: 18/306,128

(22) Filed: Apr. 24, 2023

(65) Prior Publication Data

US 2023/0362441 A1 Nov. 9, 2023

(30) Foreign Application Priority Data

May 6, 2022 (KR) ........................ 10-2022-0056211

(51) Int. Cl.
| | |
|---|---|
| H04N 21/443 | (2011.01) |
| H04L 67/00 | (2022.01) |
| H04L 69/22 | (2022.01) |
| H04N 21/422 | (2011.01) |
| H04N 21/426 | (2011.01) |
| H04N 21/45 | (2011.01) |

(52) U.S. Cl.
CPC ......... *H04N 21/4436* (2013.01); *H04L 67/34* (2013.01); *H04L 69/22* (2013.01); *H04N 21/422* (2013.01); *H04N 21/426* (2013.01); *H04N 21/4516* (2013.01)

(58) Field of Classification Search
None
See application file for complete search history.

(56) References Cited

FOREIGN PATENT DOCUMENTS

| CN | 105554525 A | * | 5/2016 |
|---|---|---|---|
| CN | 108632673 A | * | 10/2018 |
| KR | 10-0862640 B1 | | 10/2008 |
| KR | 10-1410507 B1 | | 6/2014 |
| KR | 20160030831 A | * | 3/2016 |
| KR | 10-2017-0025770 A | | 3/2017 |
| KR | 10-2017-0128651 A | | 11/2017 |
| KR | 10-2019-0045668 A | | 5/2019 |

* cited by examiner

*Primary Examiner* — Jason K Lin
(74) *Attorney, Agent, or Firm* — KORUS Patent, LLC; Seong Il Jeong

(57) ABSTRACT

A system for providing a set-top box standby power cutoff service is provided, and includes a timer configured to count a preset time after switching to a standby state, and a circuit breaker configured to cut off standby power when there is no input signal and the set-top box is not in operation after the elapse of the preset time counted by the timer.

1 Claim, 11 Drawing Sheets

SET-TOP BOX

Standby Power Cutoff

Update Function Setting

GPS Setting

TV Watching Pattern Identification & Timer Operation

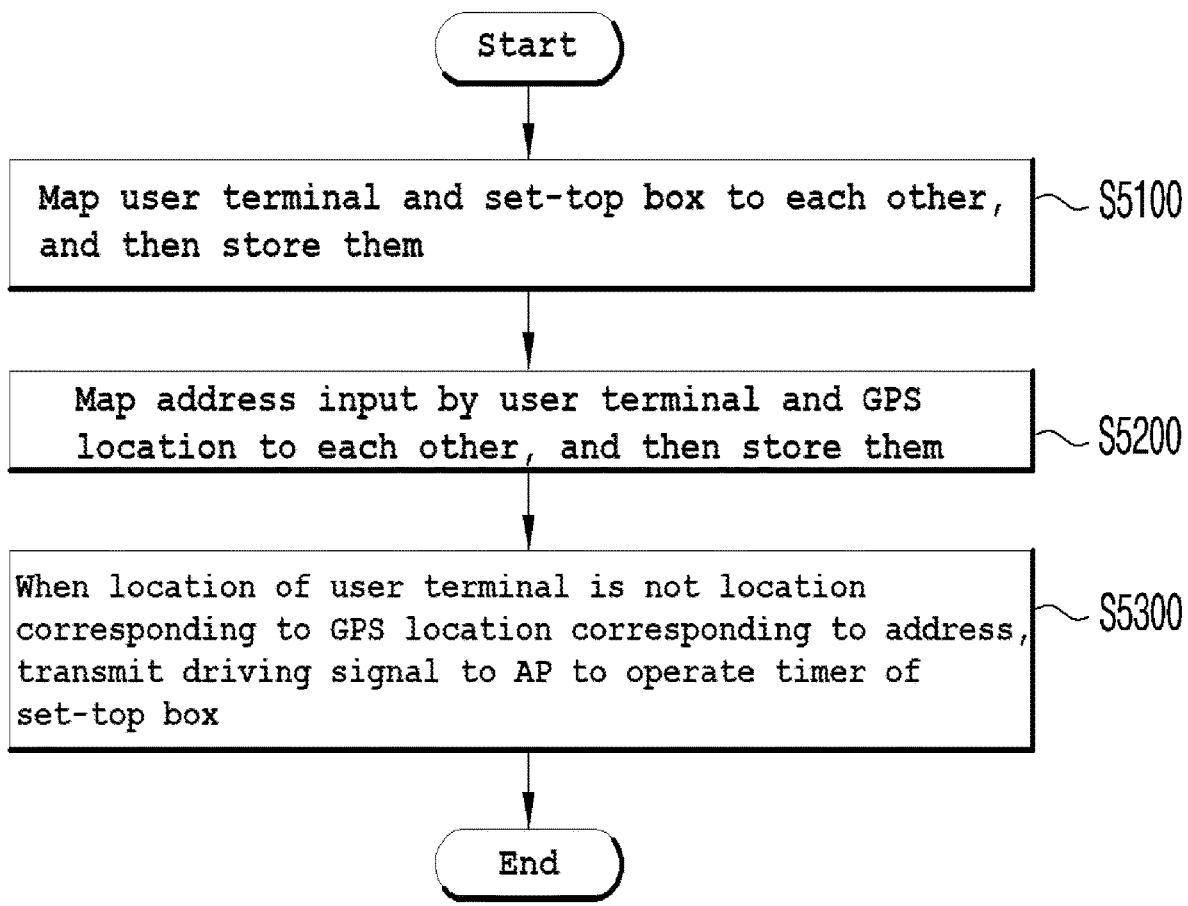

SET-TOP BOX AND SYSTEM FOR PROVIDING STANDBY POWER CUTOFF SERVICE USING THE SAME

TECHNICAL FIELD

The present invention relates to a set-top box and a system for providing a standby power cutoff service using the same, and provides a system that cuts off standby power when a preset time elapses by driving a timer after entry into a standby state in order to cut off the standby power of a set-top box.

BACKGROUND ART

According to a survey by the Korea Electric Research Institute, about 420 billion won's worth of electricity is wasted as standby power every year. The home appliance that consumes the largest amount of electricity while turned off is a set-top box, which consumes 12.3 W of electricity compared to a TV that consumes 1.3 W of electricity, and thus consumes 10 times more electricity. Standby power refers to the power consumed by a home appliance when the home appliance is turned off. In order to reduce the power consumption of the standby set-top box, in Korea and foreign countries, the operation of a set-top box in a standby state is divided into an active standby mode that performs operations necessary for updating the set-top box other than the main function of providing broadcasting service, and a passive standby mode that supports only low-power CPU operation that can process simple calculations to receive input from a remote control for the purpose of minimum power consumption, and related standardization has been carried out.

In this case, in order to cut off standby power, a method of switching from an active mode to a standby mode by using a built-in power control function or a wireless remote signal has been researched and developed. In connection with this, Korean Patent No. 10-0862640 (published on Oct. 10, 2008) and Korean Patent No. 10-0748687 (published on Aug. 13, 2007), which are prior art, respectively disclose a configuration for cutting off the power, wasted by not turning off the standby power of a set-top box connected to a main unit and the power of the set-top box, by using a set-top box equipped with a built-in power control function and allowing the power of the set-top box to be automatically switched between ON/OFF states when the main unit is operated and a configuration of, when a wireless remote control signal is received in an activation mode, providing video and audio signals corresponding to the power status information of A TV to a connector while switching to a standby mode.

However, both the former configuration and the latter configuration are configurations proposed prior to the establishment of the efficiency management equipment operation regulations and standardization of the Korean Ministry of Trade, Industry and Energy. After standardization has been completed, a standby mode is divided into an active standby mode and a passive standby mode and is performed in any one of them, so that the above configurations are meaningless in this sense. In other words, the expected power consumption of the set-top box in the passive standby mode and the expected power consumption of the set-top box in the active standby mode are 1 W and 5 W, respectively, which are much lower than 12.3 W. However, even after the standardization has been completed, the passive standby mode is more advantageous than the active standby mode in terms of a reduction in power consumption. However, set-top box providers may not prefer to use the passive standby mode because they cannot update the Electronic Program Guide (EPG) and firmware of the set-top box in the standby state in the passive standby mode, as in conventional set-top boxes. Therefore, there is a need for the research and development of a set-top box capable of performing updates in a passive standby mode when the standby power of the set-top box is cut off or the set-top box enters a standby mode.

DISCLOSURE

Technical Problem

An embodiment of the present invention may provide a system for providing a set-top box standby power cutoff service in which, in order to cut off standby power using a circuit breaker when a preset time elapses by driving a timer in a set-top box in a standby state or reduce the power consumption of the set-top box while performing update even in a standby state, update signaling can be allowed to be detected by activating network connection even in an environment where a CPU operates in a low-power mode in a passive standby mode, and returning to the low-power mode is performed when the update is complete after switching from the low-power mode to an active mode, so that a need for national-level power consumption prevention, a set-top box provider's need for update, and a user need for power saving can be all satisfied, a support need of the set-top box provider for the update of the set-top box in a standby state can also be met, and the present invention can contribute to reducing the national-level power consumption of home appliances in a standby state. However, the technical problems to be solved by the present embodiment are not limited to the technical problem described above, and other technical problems may be present.

Technical Solution

In order to accomplish the above object, an embodiment of the present invention provides a set-top box including: a timer configured to count a preset time after switching to a standby state; and a circuit breaker configured to cut off standby power when there is no input signal and the set-top box is not in operation after the elapse of the preset time counted by the timer.

Another embodiment of the present invention provides a system for providing a set-top box standby power cutoff service, the system including: a set-top box configured to count a preset time using a timer after switching to a standby state, and to cut off standby power using a circuit breaker when there is no input signal and the set-top box is not in operation after the elapse of the preset time counted by the timer; a user terminal connected via an access point (AP) to which the set-top box is connected, and configured to transmit a cutoff event for cutting off standby power when a GPS location of the user terminal is not a GPS location where the set-top box is located; and a cutoff service provision server comprising a storage unit configured to map the user terminal and the set-top box to each other and store them, a mapping unit configured to mapping an address input by the user terminal and a GPS location to each other and store them, and a cutoff management unit configured to, when the location of the user terminal is not a location corresponding to the GPS location corresponding to the address, transmit a driving signal to the AP to drive the timer of the set-top box.

Advantageous Effects

According to any one of the above-described technical solutions of the present invention, in order to cut off standby power using the circuit breaker when a preset time elapses by driving the timer in the set-top box in a standby state or reduce the power consumption of the set-top box while performing update even in a standby state, update signaling can be allowed to be detected by activating network connection even in an environment where a CPU operates in a low-power mode in a passive standby mode, and returning to the low-power mode is performed when the update is complete after switching from the low-power mode to an active mode, so that a need for national-level power consumption prevention, a set-top box provider's need for update, and a user need for power saving can be all satisfied, a support need of the set-top box provider for the update of the set-top box in a standby state can be met, and the present invention can contribute to reducing the national-level power consumption of home appliances in a standby state.

DESCRIPTION OF DRAWINGS

FIG. 5 is an operational flowchart illustrating a method of providing a set-top box standby power cutoff service according to an embodiment of the present invention.

MODE FOR INVENTION

Figure 1:
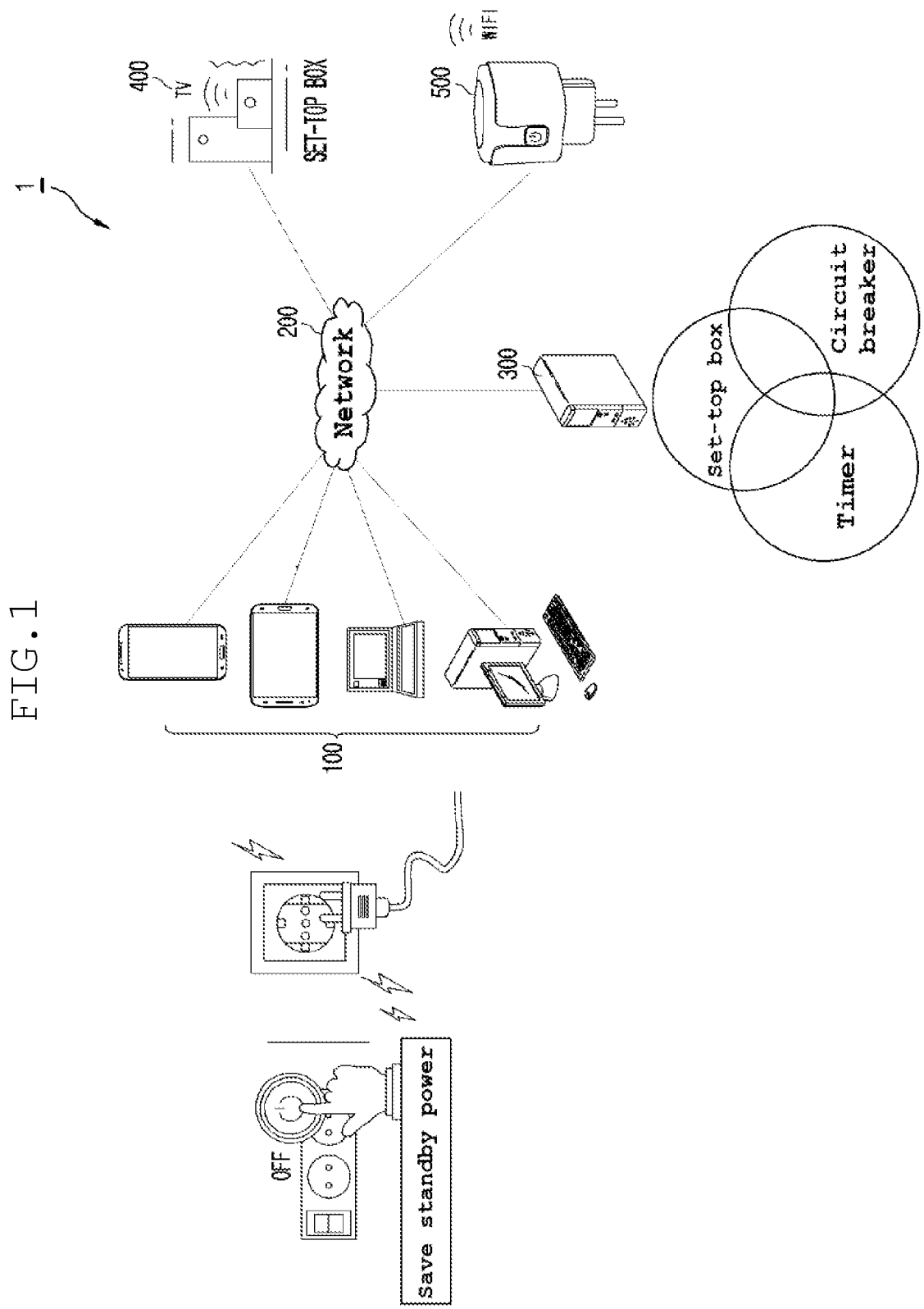
FIG. 1 is a diagram illustrating a system for providing a set-top box standby power cutoff service according to an embodiment of the present invention.

Hereinafter, embodiments of the present invention will be described in detail such that those skilled in the art can easily practice the present invention with reference to the accompanying drawings. However, the present invention may be embodied in many different forms and is not limited to the embodiments described herein. Furthermore, in order to clearly illustrate the present invention in the drawings, parts unrelated to the description are omitted, and similar reference numerals are assigned to similar parts throughout the specification.

Throughout the specification, when a part is described as being "connected" to another part, this includes not only a case where they are "directly connected" to each other but also a case where they are "electrically connected" with another element interposed therebetween. In addition, when a part is described as "including" a specific component, it means that it may further include another component, rather than excluding another component, unless otherwise stated. It should be understood that it does not preclude the possibility of the presence or addition of one or more other features, numbers, steps, operations, components, parts, or combinations thereof.

The terms of degree such as "about," "substantially," etc. used throughout the specification are used to means a corresponding numerical value or a numerical value approximating the corresponding numerical value when a manufacturing or material tolerance inherent in a stated meaning is presented. These terms are used to prevent unscrupulous infringers from exploiting the disclosure in which exact or absolute figures are mentioned to aid understanding of the present invention. The term "step of (doing)" or "step of" used throughout the specification of the present invention does not mean "step for."

In this specification, a "unit" includes a unit realized by hardware, a unit realized by software, and a unit realized using both. Furthermore, one unit may be realized using two or more pieces of hardware, and two or more units may be realized by one piece of hardware. Meanwhile, '~unit' is not limited to software or hardware, and '~unit' may be configured to be in an addressable storage medium or configured to reproduce one or more processors. Accordingly, as an example, '~unit' includes components such as software components, object-oriented software components, class components, and task components, processes, functions, properties, procedures, subroutines, segments of program code, drivers, firmware, microcode, circuitry, data, databases, data structures, tables, arrays and variables. Functions provided within components and '~units' may be combined with smaller numbers of components and '~units' or may be further separated into additional components and '~units.' In addition, components and '~units' may be implemented to reproduce one or more CPUs within a device or a secure multimedia card.

In this specification, some of the operations or functions described as being performed by a terminal, an apparatus, or a device may be performed instead by a server connected to the terminal, the apparatus, or the device. In a similar manner, some of the operations or functions described as being performed by a server may also be performed by a terminal, an apparatus, or a device connected to the server.

In this specification, some of the operations or functions described as mapping or matching with a terminal may be interpreted as mapping or matching with the terminal's unique number, which is the terminal's identifying data, or personal identification information.

The present invention will be described in detail below with reference to the accompanying drawings.

FIG. 1 is a diagram illustrating a system for providing a set-top box standby power cutoff service according to an embodiment of the present invention. Referring to FIG. 1, the system 1 for providing a set-top box standby power cutoff service may include at least one user terminal 100, a cutoff service provision server 300, at least one set-top box 400, and at least one IoT outlet 500. However, since the system 1 for providing a set-top box standby power cutoff service of FIG. 1 is merely one embodiment of the present invention, the present invention is not limitedly interpreted through FIG. 1.

In this case, the individual components of FIG. 1 are generally connected over a network 200. For example, as shown in FIG. 1, the at least one user terminal 100 may be connected to the cutoff service provision server 300 over the network 200. Furthermore, the cutoff service provision server 300 may be connected to the at least one user terminal 100, the at least one set-top box 400, and the at least one IoT outlet 500 over the network 200. Furthermore, the at least one set-top box 400 may be connected to the cutoff service provision server 300 over the network 200. Moreover, the at least one IoT outlet 500 may be connected to the at least one user terminal 100, the cutoff service provision server 300, and the at least one set-top box 400 over the network 200.

In this case, the network refers to a connection structure that enables information to be exchanged between individual nodes, such as a plurality of terminals and servers. Examples of the network include a local area network (LAN), a wide area network (WAN), a World Wide Web (WWW), a wired/wireless data communication network, a telephone network, a wired/wireless television communication network, and the like. Examples of the wireless data communication network include, but are not limited thereto, 3G, 4G, 5G, 3rd Generation Partnership Project (3GPP), 5th Generation Partnership Project (5GPP) networks, a Long Tam Evolution (LTE) network, a World Interoperability for Microwave Access (WIMAX) network, a Wi-Fi network, the Internet, a Local Area Network (LAN), a Wireless Local Area Network (Wireless LAN), a Wide Area Network (WAN), a Personal Area Network (PAN), a Radio Frequency (RF) network, a Bluetooth network, a Near-Field Communication (NFC) network, a satellite broadcasting network, an analog broadcasting network, a Digital Multimedia Broadcasting (DMB) network, etc.

In the following description, the tam at least one is defined as a term including singular and plural. Even when the tam at least one is not present, it will be apparent that each component may be present in a singular or plural form and may refer to a singular or plural form. In addition, each component may be in a singular form or a plural form depending on the embodiment.

The at least one user terminal 100 is a terminal of a user who sets a GPS using a set-top box standby power cutoff service-related web page, app page, program or application and registers the set-top box 400 using WIFI or the like. Furthermore, the user terminal 100 may be a terminal that sets an IF-THEN condition for cutting off standby power and registers it with the cutoff service providing server 300, or receives the amount of power saved from the cutoff service provision server 300 and displays it.

In this case, the at least one user terminal 100 may be implemented as a computer capable of accessing a remote server or terminal over a network. In this case, the computer may include, e.g., a notebook, a desktop, a laptop, and the like each equipped with a navigation system and a web browser. In this case, the at least one user terminal 100 may be implemented as a terminal capable of accessing a remote server or terminal over a network. The at least one user terminal 100 is, e.g., a wireless communication device ensuring portability and mobility, and may include all types of handheld-based wireless communication devices such as a navigation terminal, a Personal Communication System (PCS) terminal, a Global System for Mobile communications (GSM) terminal, a Personal Digital Cellular (PDC) terminal, a Personal Handyphone System (PHS) terminal, a Personal Digital Assistant (PDA), an International Mobile Telecommunication (IMT)-2000 terminal, a Code Division Multiple Access (CDMA)-2000 terminal, a W-Code Division Multiple Access (W-CDMA) terminal, a Wireless Broadband Internet (Wibro) terminal, a smartphone, a smart pad, and a tablet PC.

The cutoff service provision server 300 may be a server that provides a set-top box standby power cutoff service-related web page, app page, program, or application. The cutoff service provision server 300 may be a server that connects the user terminal 100 and the set-top box 400 when the user terminal 100 registers the set-top box 400. Furthermore, the cutoff service provision server 300 may be a server that maps the IoT outlet 500 to the user terminal 100 and stores it when the user terminal 100 registers the IoT outlet 500. Moreover, the cutoff service provision server 300 may be a server that, when the user terminal 100 sets a condition for driving the timer of the set-top box 400, drives the timer and also cuts off standby power only when the condition is met. The cutoff service provision server 300 may be a server that generates an infographic of the amount of power consumed by standby power and the amount of power saved by cutoff and transmits it to the user terminal 100. In addition, the cutoff service provision server 300 may be a server that provides points corresponding to the amount of power saved. The cutoff service provision server 300 may be a server that collects sensor data and input data when a TV is turned on in the user terminal 100, identifies a pattern, and drives a timer when a time, a keyboard input, a touch, or the like that does not match the pattern occurs. Accordingly, even when a user turns on the TV and falls asleep, the cutoff service provision server 300 may be a server that turns off both the TV and the set-top box 400 and cut offs standby power when sleep is confirmed.

In this case, the cutoff service provision server 300 may be implemented as a computer capable of accessing a remote server or a terminal over a network. In this case, the computer may include, e.g., a laptop, a desktop, a laptop, and the like each equipped with a navigation system and a web browser.

The at least one set-top box 400 may be a device that receives a timer drive signal using a set-top box standby power cutoff service-related web page, app page, program, or application. The set-top box 400 may be a device that cuts off standby power so that standby power is cut off when a timer is driven and a predetermined time is counted.

In this case, the at least one set-top box 400 may be implemented as a computer capable of accessing a remote server or terminal over a network. In this case, the computer may include, e.g., a notebook, a desktop, a laptop, and the like each equipped with a navigation system and a web browser. In this case, the at least one set-top box 400 may be implemented as a terminal capable of accessing a remote server or terminal over a network. The at least one set-top box 400 is, e.g., a wireless communication device ensuring portability and mobility, and may include all types of handheld-based wireless communication devices such as a navigation terminal, a Personal Communication System (PCS) terminal, a Global System for Mobile communications (GSM) terminal, a Personal Digital Cellular (PDC) terminal, a Personal Handyphone System (PHS) terminal, a Personal Digital Assistant (PDA), an International Mobile Telecommunication (IMT)-2000 terminal, a Code Division Multiple Access (CDMA)-2000 terminal, a W-Code Division Multiple Access (W-CDMA) terminal, a Wireless Broadband Internet (Wibro) terminal, a smartphone, a smart pad, and a tablet PC.

The at least one IoT outlet 500 may be a device that cuts off power to prevent power from being supplied using a set-top box standby power cutoff service-related web page, app page, program, or application. For example, the IoT outlet 500 may be a device that cuts off standby power in such a manner that a switch is turned off when the device is turned off, such as a power strip equipped with a switch.

In this case, the at least one IoT outlet 500 may be implemented as a computer capable of accessing a remote server or terminal over a network. In this case, the computer may include, e.g., a notebook, a desktop, a laptop, and the like each equipped with a navigation system and a web browser. In this case, the at least one IoT outlet 500 may be implemented as a terminal capable of accessing a remote server or terminal over a network. The at least one set-top box 400 is, e.g., a wireless communication device ensuring portability and mobility, and may include all types of handheld-based wireless communication devices such as a navigation terminal, a Personal Communication System (PCS) terminal, a Global System for Mobile communications (GSM) terminal, a Personal Digital Cellular (PDC) terminal, a Personal Handyphone System (PHS) terminal, a Personal Digital Assistant (PDA), an International Mobile Telecommunication (IMT)-2000 terminal, a Code Division Multiple Access (CDMA)-2000 terminal, a W-Code Division Multiple Access (W-CDMA) terminal, a Wireless Broadband Internet (Wibro) terminal, a smartphone, a smart pad, and a tablet PC.

Figure 2:
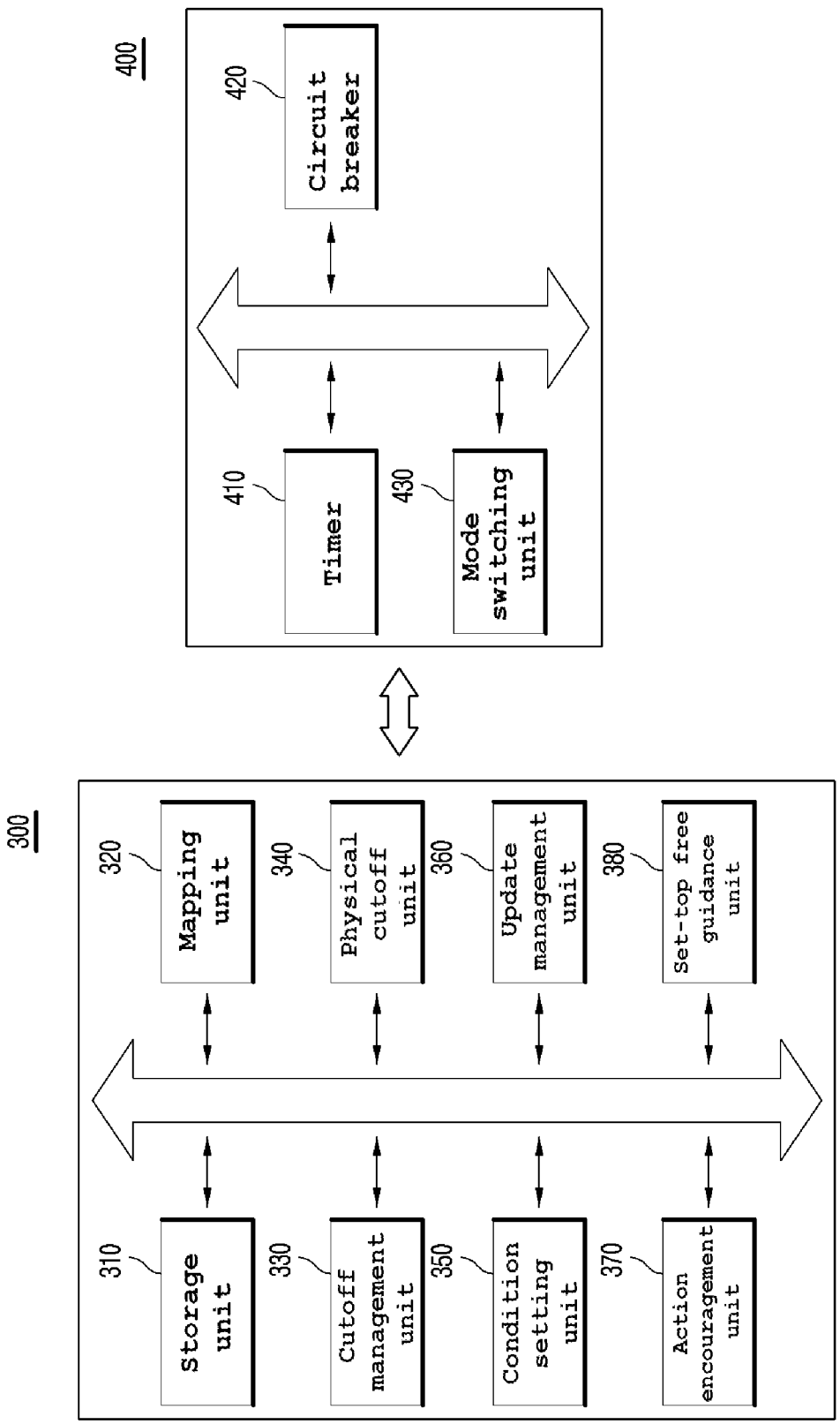
FIG. 2 is a block diagram illustrating a cutoff service provision server included in the system of FIG. 1.

FIG. 2 is a block diagram illustrating a cutoff service provision server included in the system of FIG. 1, and FIGS. 3A-3D and FIGS. 4A-4D are diagrams illustrating an embodiment in which a set-top box standby power cutoff service is implemented according to an embodiment of the present invention.

Referring to FIG. 2, the cutoff service provision server 300 includes a storage unit 310, a mapping unit 320, a cutoff management unit 330, a physical cutoff unit 340, a condition setting unit 350, a control unit 360, an update management unit 370, an action encouragement unit 380, and a set-top free guidance unit 390. The set-top box 400 may include a timer 410, a circuit breaker 420, and a mode switching unit 430.

When the cutoff service provision server 300 according to an embodiment of the present invention or another server (not shown) operating in conjunction with the cutoff service provision server 300 transmits a set-top box standby power blocking service application, program, app page, or web page to the at least one user terminal 100, the at least one set-top box 400, and the at least one IoT outlet 500, the at least one user terminal 100, the at least one set-top box 400, and the at least one IoT outlet 500 may install or open the set-top box standby power cutoff service application, program, app page, or web page. Furthermore, the service program may be run in the at least one user terminal 100, the at least one set-top box 400, and the at least one IoT outlet 500 using a script executed on a web browser. Furthermore, the web browser is a program that enables World Wide Web (WWW) services to be allowed, refers to a program that receives and displays hypertext written in Hyper Text Markup Language (HTML), and includes, e.g., Netscape, Explorer, Chrome, and the like. Moreover, the application refers to an application on a terminal, and includes, e.g., an app running on a mobile terminal (a smartphone).

Referring to FIG. 2, a first embodiment, which is an embodiment of the present invention, is configured to cut off standby power using only the set-top box 400, and a second embodiment, which is another embodiment of the present invention, is configured to cut off standby power with the set-top box 400, the user terminal 100, the IoT outlet 500, and the cutoff service provision server 300 constituting the system. In the following description, although the two embodiments are separated and described below for convenience of description, it should be noted that they are not necessarily implemented in a separate form.

First Embodiment

The set-top box 400 has a timer 410 configured to count a predetermined time after being switched to a standby state, and a circuit breaker 420 configured to cut off standby power when a predetermined time counted by the timer 410 has elapsed and there is no input signal while operation is not performed. In this case, the standby state refers to a state in which standby power is consumed in such a manner that, although the power button is connected to the outlet and red light is turned on, the power button is turned off and consumes standby power although it is actually turned off.

After switching to the standby state, the mode switching unit 430 allows the system mode to enter a passive standby mode in which the CPU of the set-top box 400 operates in a low-power mode during the standby state before driving the timer 410, and activates a network interface in the low-power mode. When an update of the set-top box 400 occurs in the low-power mode, the mode switching unit 430 switches the CPU operating in the low-power mode to an activation mode to perform the update, and may switch the CPU from the activation mode to the low-power mode when the update is completed.

Protocol Used for Control of Set-Top Box

The message protocol used to control IPTV and cable broadcasting set-top boxes will now be described. First, a protocol format for the control of a set-top box is a form in which a User Datagram Protocol (UDP)/Internet Protocol (IP) packet is carried by an Ethernet frame. A protocol format for the control of a cable broadcasting set-top box is a form in which an Ethernet frame and a UDP/IP packet are carried on top of a Data Over Cable Service Interface Specification (DOCSIS) protocol. In order to process a control message for the set-top box, DOCSIS, Ethernet, IP, and UDP protocols need to be interpreted and processed. However, a high amount of computational load is required to interpret the protocols, so that it is difficult to interpret and process the protocols when the CPU operates in a low-power mode, as in a passive standby mode. Therefore, there is used a method capable of simplifying the interpretation and processing of the set-top box control protocols using the formats of the corresponding protocols.

Standby State Operable Even With Low-Power CPU

In one embodiment of the present invention, while the set-top box 400 is in a standby state, the CPU operates in a low-power mode like in a passive standby mode, but a network interface is activated unlike in the passive standby mode. When an update of the set-top box 400 is required, the operator of the set-top box 400 switches the operation of the CPU of the set-top box 400 from a low-power mode to an active mode that enables normal CPU operation, thereby enabling the set-top box 400 to be updated. To this end, the CPU in the low-power mode needs to be able to perform the interpretation and processing of Ethernet, DOCSIS, and UDP/IP protocols with a small amount of computational load.

In order to simplify the interpretation and processing of the protocols, the use of a predetermined protocol pattern may be a method. One of such methods is Wake on LAN (WoL), and WoL uses the repeated pattern of the MAC (Media Access Control) address of the network interface of a receiving side as a protocol pattern. Since WoL has been currently implemented in many CPUs, it may be used to control the set-top box 400 in a standby state according to an embodiment of the present invention. A second method of simplifying the interpretation and processing of protocols is to find out how to process a meaningful message by simplifying the calculation of a control protocol header for the set-top box 400. The lengths of fields except for variable optional fields are fixed in the protocol header. Accordingly, when the length of the header is calculated by calculating the variable fields, operation may be performed even in the CPU in the low-power mode when only the meaningful part is interpreted and processed without the need to interpret the overall message protocol. Although this method is not as popular as WoL, it has the advantage of lower power consumption over WoL because it only performs simple calculations to find out a message start position.

In addition to the protocol interpretation and process simplification method, it is necessary to consider measures to deal with the retrieval of the IP address, which is a unique identifier of the set-top box 400, for each medium. When the CPU of the IPTV set-top box 400 operates in a low-power mode, there is a possibility that the IP address may be retrieved. Accordingly, the IPTV set-top box 400 needs to perform an Address Resolution Protocol (ARP) process even in a standby state in order to prevent the IP address from being retrieved. However, in the case of the cable broadcasting set-top box 400, a separate ARP process does not need to be performed in a standby state because a Cable Modem Termination System (CMTS) performs management in order to prevent the IP address of the cable modem of the cable broadcasting set-top box from being retrieved.

Using this simplified protocol interpretation and processing, low-power operation is possible even in the standby state of the set-top box 400. The power consumption of the set-top box 400 in the standby state requires only the additional power consumption of the network interface in the passive standby mode. When the power consumption of the network interface is 0.5 W, the power consumption of the set-top box 400 in the standby state according to an embodiment of the present invention may be predicted to be 1.5 W. Even when the update of the set-top box 400 is performed in the standby state, the update is performed within an average of 2 hours out of 24 hours a day, so that an average of 2 W or more may not be consumed in the standby state.

Second Embodiment

The storage unit 310 may store the user terminal 100 and the set-top box 400 in a state in which they have been mapped to each other. The reason for operating in conjunction with the user terminal 100 is as follows. When a user leaves his or her house, i.e., when a user moves out of the address at which the set-top box 400 is installed, the timer 410 that cuts off standby power in a standby state may be driven and cutoff may be performed using the circuit breaker 420.

However, if the timer 410 is driven and the circuit breaker 420 is continuously operated in a situation where a TV can be turned on at any time while at home, power consumption increases accordingly, resulting in a situation where the tail is wagging the dog. Like most people pull out all outlets when they leave the house, a case where a user goes outside or goes out to work or school periodically may be identified by determining the location of the user terminal 100, and may drive only the circuit breaker 420 without performing cutoff using the circuit breaker 420 by driving the timer 410. In addition, when a pattern in which even when a user is at home, he or she does not turn on a TV while working from home because he or she works from home but turns on a TV after work is identified, standby power may be cut off by directly driving the circuit breaker 420 in situations other than the pattern. If a user frequently falls asleep after turning on a TV, this situation may be detected using the sleep check function of the user terminal 100, the power of a TV and the set-top box 400 may be turned off together, and also the standby power of the set-top box 400 may be cut off by driving the circuit breaker 420.

The mapping unit 320 may map an address input by the user terminal 100 and a GPS location to each other and then store them. When the user terminal 100 is connected via an access point (AP) to which the set-top box 400 is connected, and a cutoff event adapted to cut off standby power may be transmitted when the GPS location of the user terminal 100 is not the GPS location where the set-top box 400 is located. Recently, an interface that allows various settings, such as the control of various IoT devices or the turning on/off of Bluetooth, to be made by attaching [IF-THEN] conditions in each smartphone has been released. For example, there may be made various user settings, such as setting WIFI to mobile data (THEN) when the GPS location is not the home address (IF) and playing Spotify music immediately (THEN) when Bluetooth earphones are connected (IF). Accordingly, when the GPS location of each user terminal 100 departs from the home address, i.e., the place where the set-top box 400 is located, the circuit breaker 420 may be driven directly without driving the timer 410. It is obvious that the driving of the timer 410 is not excluded. When the user leaves his or her house, like he or she goes to work, the timer 410 is not always in a state where the user can turn it on and off, so that the circuit breaker 420 is driven directly without the driving of the timer 410.

The cutoff management unit 330 may transmit a driving signal to the AP to drive the timer 410 of the set-top box 400 when the location of the user terminal 100 is not a location corresponding to the GPS location corresponding to the address. Accordingly, the set-top box 400 counts a preset time using the timer 410 after switching to the standby state, and standby power may be cut off using the circuit breaker 420 when a preset time counted by the timer 410 has elapsed and there is no input signal while the set-top box 400 is not in operation.

When the GPS location of the user terminal 100 is not the GPS location corresponding to the address, the physical cutoff unit 330 may cut off power by turning off the IoT outlet 500. The IoT outlet 500 may be a device via which a power line is introduced into the set-top box 400. By using the switch of a power strip, standby power is turned on and off without unplugging. Furthermore, the recent IoT outlet 500 is an Internet of Things-based outlet connected to WIFI or the like so that the user can collectively turn off lights over the Internet. When the plug is plugged into the outlet, standby power is consumed even when power is turned off. When the IoT outlet 500 is used, standby power is not cut off at a set-top box (400) end, but is cut off at an IoT outlet (500) end, so that the user can control it from the outside. That is, when it is not automatically turned off or is not set to be automatically turned off, it can be turned off by accessing the platform of the present invention even when the user is outside or on a business trip abroad. However, in this case, it is assumed that the WIFI is turned on. Accordingly, when the user's exit is confirmed, that is, the exit is confirmed by the GPS location, the IoT outlet 500 is immediately driven, and then the WIFI itself is powered off using the timer and circuit breaker of the present invention. It is obvious that, in the case of a situation where WIFI needs to be always operating so that CCTV can be connected to the Internet, WIFI may be set to be always turned on.

The condition setting unit 350 collects the input data of the user terminal 100 and sensor data when the set-top box 400 and the TV are turned on and are in operation, extracts the pattern of the input data and the sensor data when the set-top box 400 and the TV are in operation, and may drive the timer 410 of the set-top box 400 at a time when input data and sensor data that do not match the pattern are collected. For example, when a pattern such as a case where the frequency at which KakaoTalk is checked decreases when the user watches the set-top box 400 and the TV or a case where an illumination level decreases after turning off lights and lying in bed, is identified, a corresponding situation may be used as a signal for driving the timer 410 when data that does not match this pattern is detected by the user terminal 100. In addition, a function of estimating the sleep time may be present in the user terminal 100. This estimates the period spanning from the time when there is no more input in the user terminal 100 to the time when the input starts to occur again as the sleep time. In this case, when a preset period, e.g., 1 hour, has elapsed since there was no input, for example, when the user falls asleep, the power of the set-top box 400 itself may be turned off and then standby power may also be cut off using the circuit breaker 420. In this case, a context awareness algorithm may be further used.

The control unit 360 measures the amounts of standby power consumed by the set-top box 400 and time spans, transmits them to the user terminal 100, and may perform control to cut off power by driving the IoT outlet 500 according to driving conditions when the operating conditions of the IoT outlet 500 of the set-top box 400 is set using an IF-THEN conditional statement in the user terminal 100. For example, even when a situation is identified using a context awareness algorithm or pattern recognition, it may be most accurate for a person to finally inspect and identify it. Accordingly, the control unit 360 may inform the user of time spans and the amounts of standby power generated, and may ask whether to further set conditions for these time spans to drive the IoT outlet 500, that is, to cut off the power, and/or may receive additional settings. In this case, the manual settings set by the user may be added to the automatic settings set by default in the platform of the present invention, so that more detailed standby power management can be performed. The data manually set above may be collected into the platform of the present invention, and may be used as update data to be added to conditions to be automatically set in the future.

The update management unit 370 checks an update date and time for the set-top box 400 from at least one set-top box (400) provider terminal, and releases the circuit breaker 420 at the update time of the update date for the set-top box 400 so that the operation mode can be switched to an active standby mode in a standby mode. In this case, the second embodiment is different from the first embodiment in that, in the first embodiment, the low-power CPU is switched to the active mode while continuing to wait in the passive standby mode, and in the second embodiment, an update date and a time span are received from the set-top box provider, e.g., SKT, LGU+, KT, or the like and the operation mode is switched to the active standby mode so that update is possible only in the time span. Most of the update dates are scheduled, so that the operation mode is switched to the active standby mode only during these time spans and is switched back to the passive standby mode after the completion of update. In the first embodiment, the network connection is activated in the passive standby mode. In contrast, in the second embodiment, there is no need to monitor update, so that the operation mode is normal passive standby mode and network connection is not activated.

After standby power has been cut off using the breaker 420 of the set-top box 400, the action encouragement unit 380 may provide points corresponding to the expected amount of power saved. Recently, the Ministry of Environment in Korea is implementing an incentive system in which carbon points are paid when standby power is saved and vouchers for public facilities are received free of charge according to performance. Even in an embodiment of the present invention, the participation of each user may be encouraged by providing points based on the amount of power corresponding to the time span for which standby power is cut off.

The set-top free guidance unit 390 checks the model name of the TV registered by the user terminal 100. When the model name corresponds to a TV capable of installing the set-top box 400 program, the set-top free guidance unit 390 may recommend and guide the uninstallation of the set-top box 400 to the user terminal 100, and display the expected amount of power saved and points when the set-top box 400 is uninstalled. A recent smart TV allows a program replacing the set-top box 400 to be installed without the installation of the set-top box 400, thereby providing an effect that is the same as the effect of putting the set-top box 400 in a smart TV. Therefore, there may be used a method in which the TV model name input by each user terminal 100 is checked and, when the TV model corresponds to a smart TV and is a TV in which a program can be installed and run, the uninstallation of the set-top box 400 is recommended and points are paid in the case of uninstallation.

Hereinafter, an operating process according to the configuration of the above-described cutoff service provision server of FIG. 2 will be described in detail with reference to FIGS. 3A-3D and FIGS. 4A-4D as examples. However, it will be apparent that the embodiment is only any one of various embodiments of the present invention, and the present invention is not limited thereto.

Figure 3A:
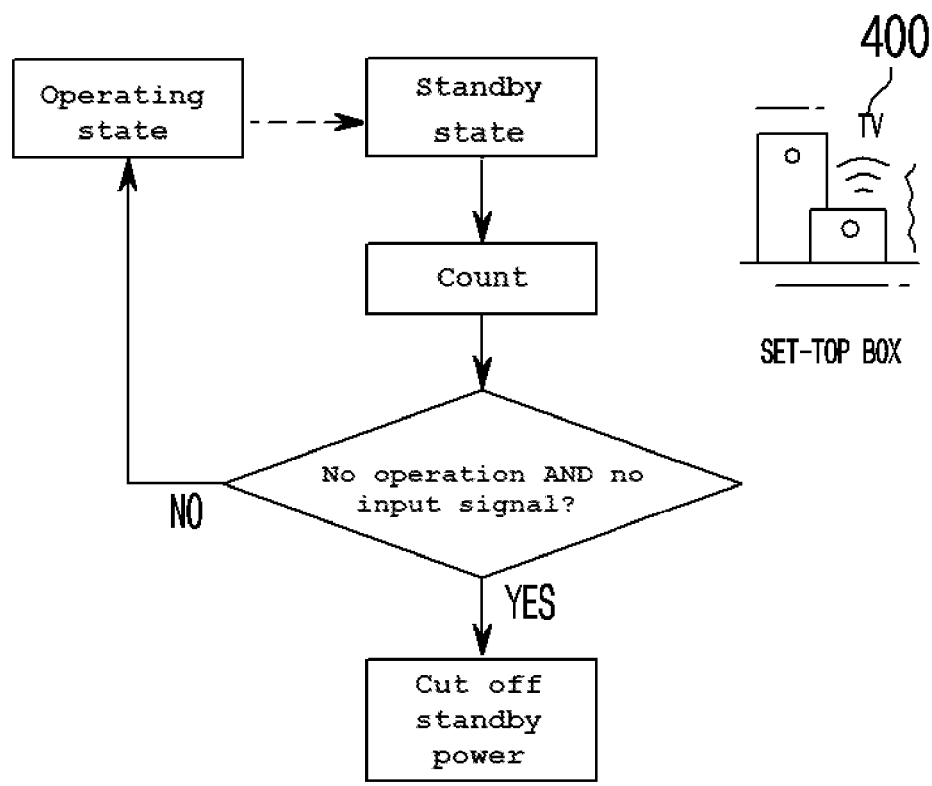
FIGS. 3A-3D and FIGS. 4A-4D are diagrams illustrating an embodiment in which a set-top box standby power cutoff service is implemented according to an embodiment of the present invention.
Figure 3B:
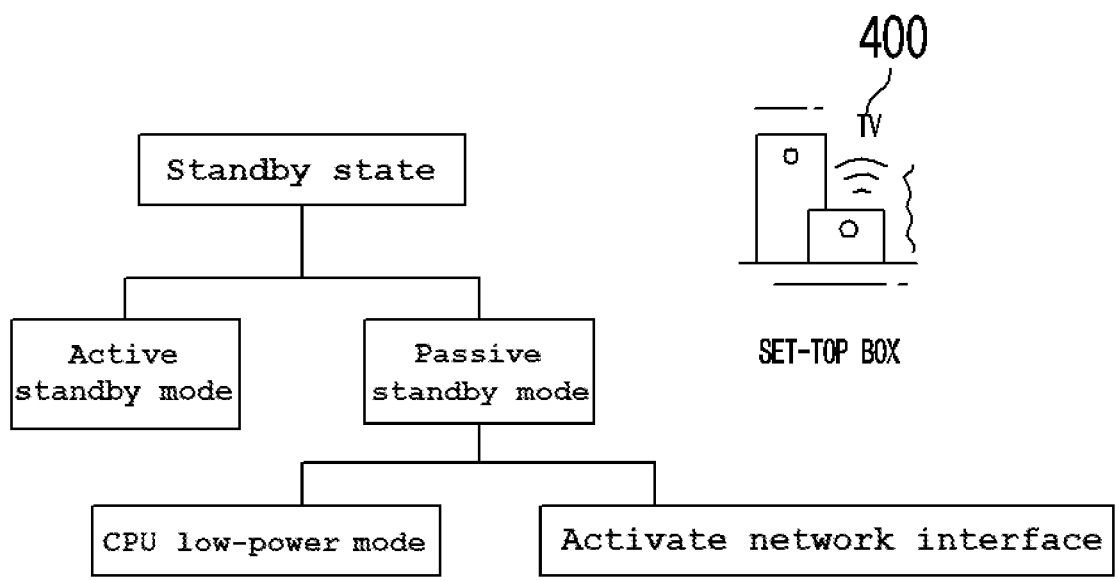
Figure 3C:
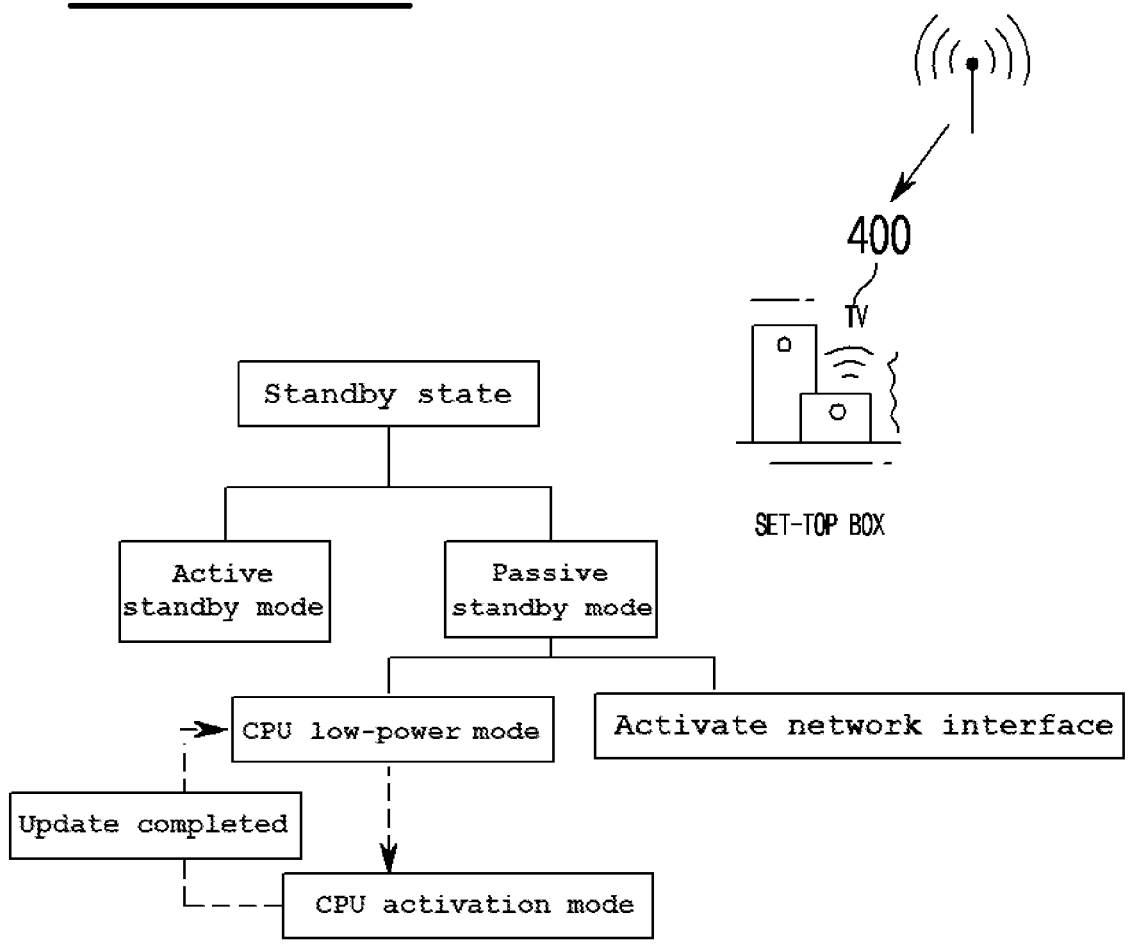

Referring to FIGS. 3A-3D, as shown in FIG. 3A, when the set-top box 400 is in a standby state, it starts counting using the timer 410, and even after a preset time has elapsed, and drives the circuit breaker 420 to cut off standby power when it is not in operation and there is no input signal even after a preset time has elapsed. When the set-top box 400 is in operation or there is an input signal, it is immediately switched to a driving state rather than a standby state. In order to switch the set-top box 400 from the drive state to the standby state again, a signal or button input to turn off the power is required. As shown in FIG. 3B, the set-top box 400 activates the network interface in addition to driving in the CPU low-power mode in the passive standby mode in order to update the set-top box 400. As shown in FIG. 3C, when update is performed, a method of switching to a CPU activation mode and then switching to a CPU low power state when the update is completed may be used.

Figure 3D:
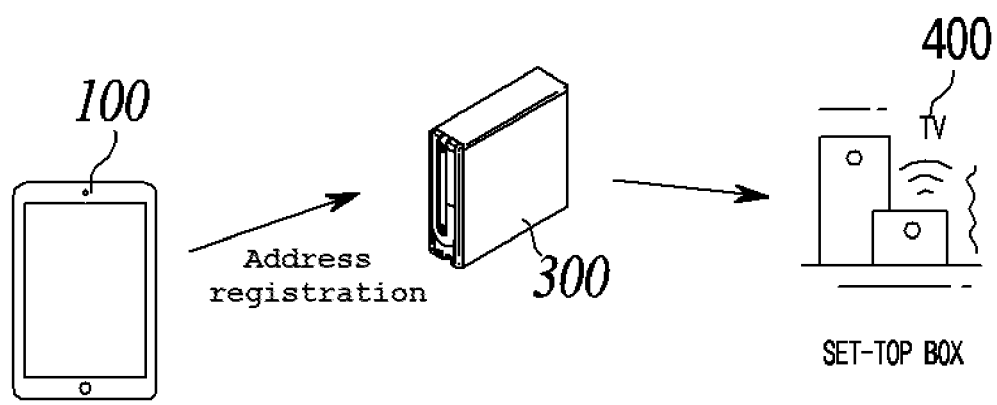
Figure 3D:
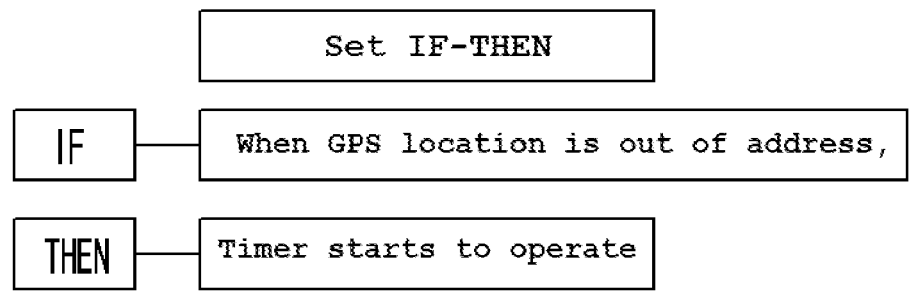
Figure 4A:
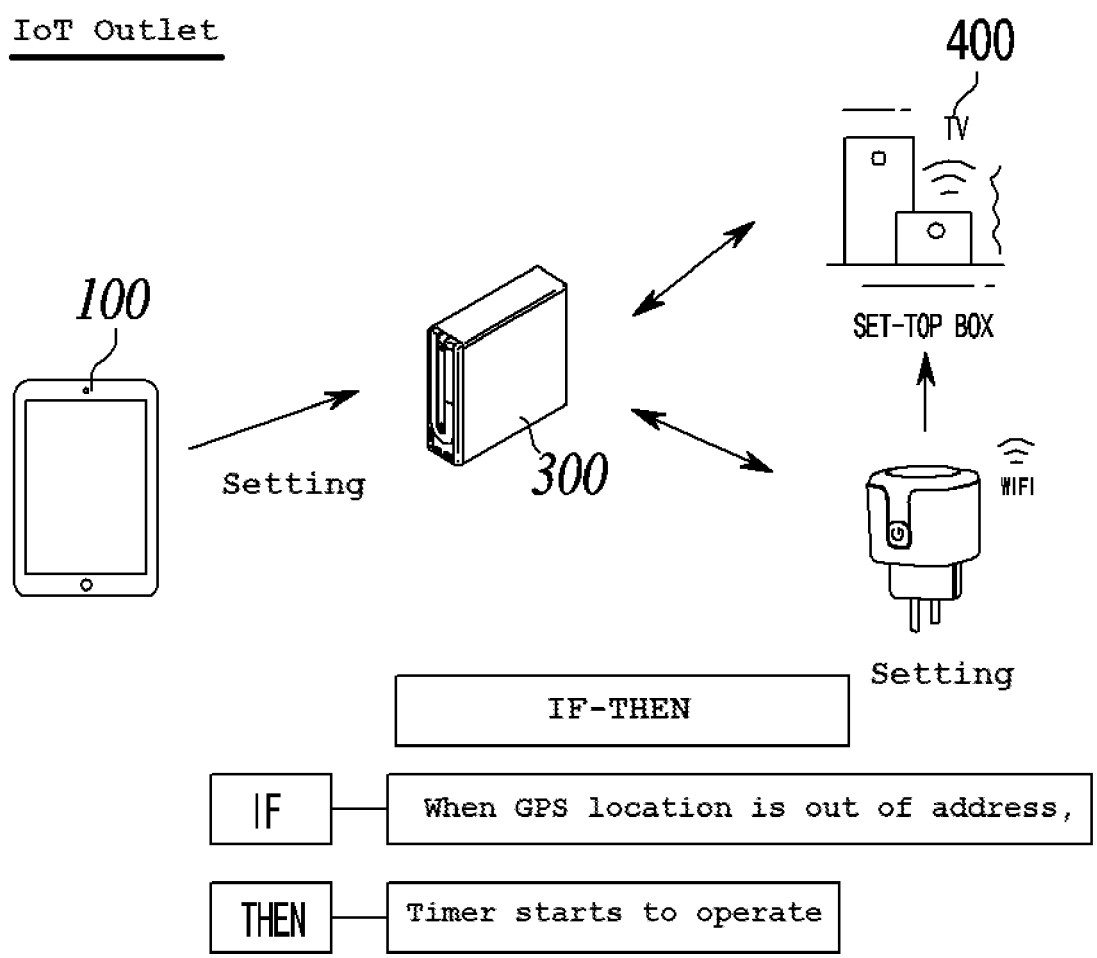
Figure 4B:
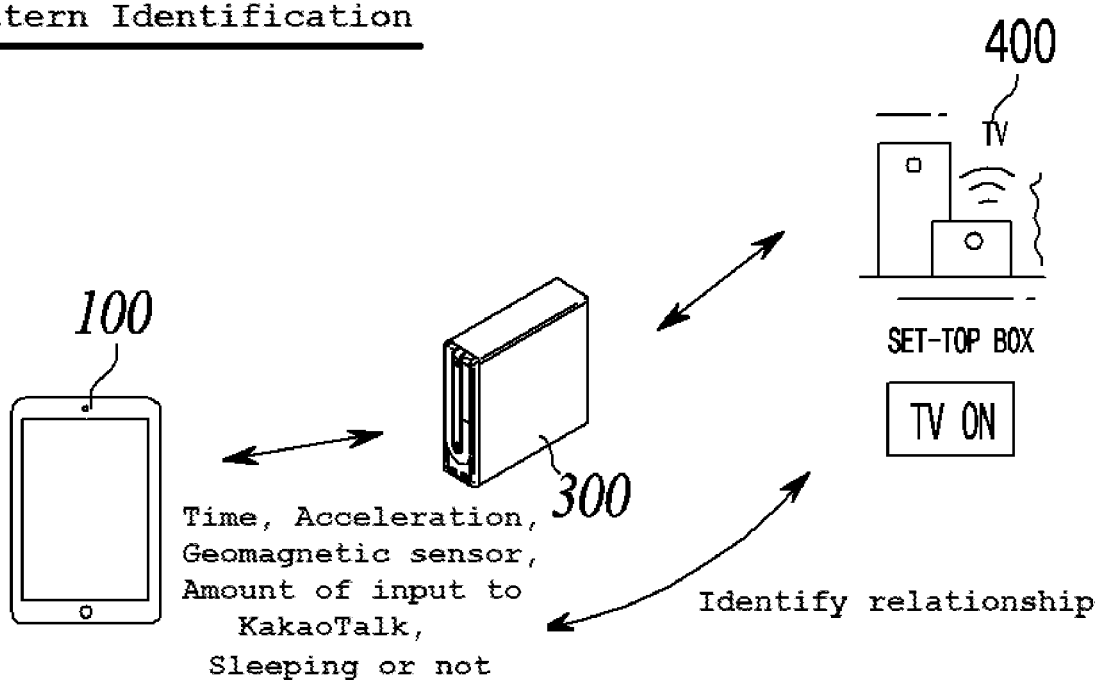
Figure 4C:
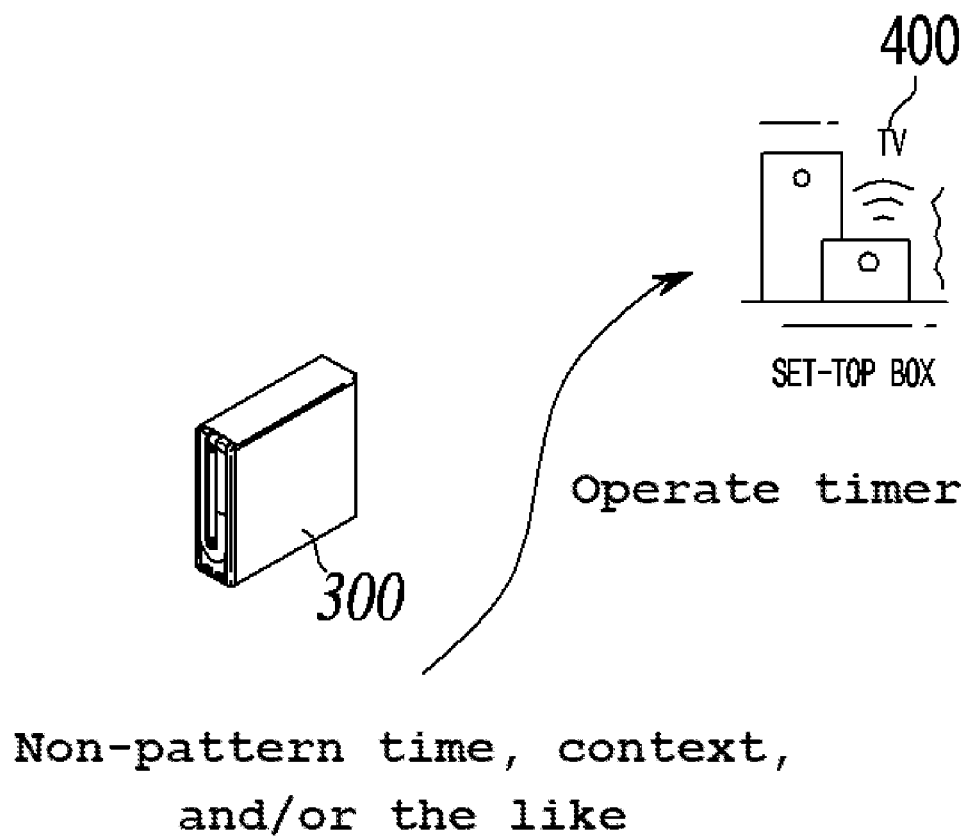
Figure 4D:
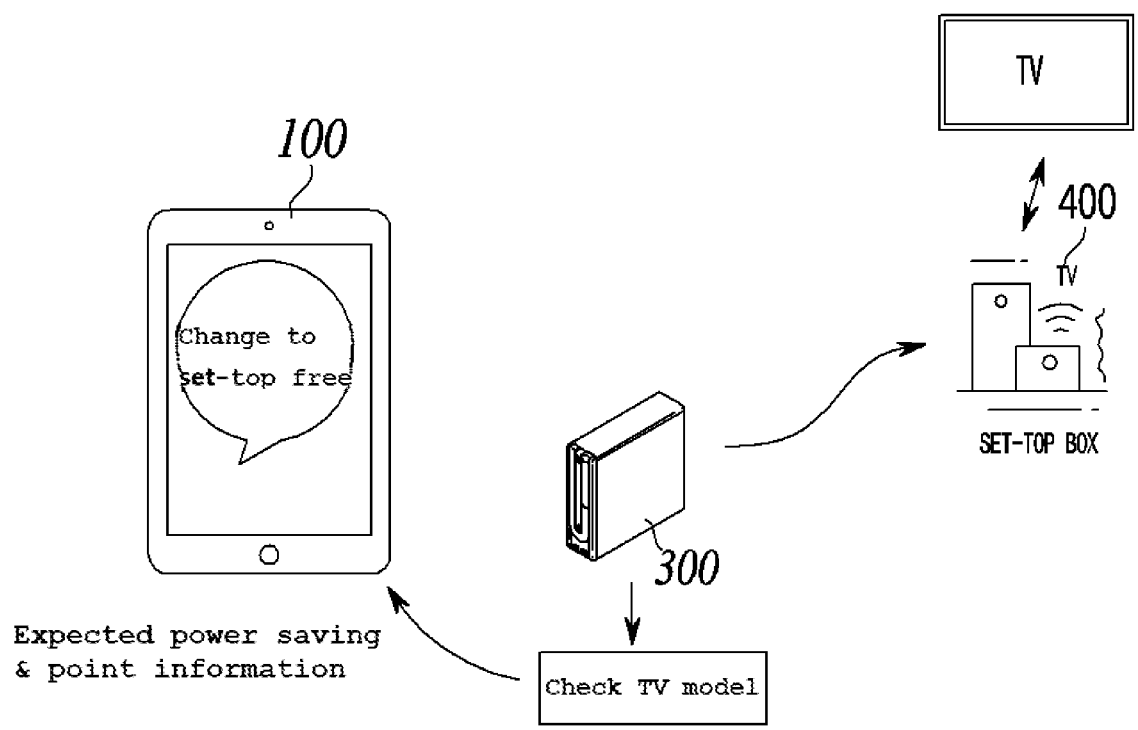

Alternatively, as in FIG. 3D, the cutoff service provision server 300 may set a condition in the user terminal 100 to cut off standby power of the set-top box 400. As shown in FIG. 4A, the turn-off condition of the IoT outlet 500 may be set to completely cut off power beyond cutting of standby power. As in FIG. 4B, the cutoff service provision server 300 may identify the pattern of the user terminal 100, identifies when and under what circumstances the user watches TV as in FIG. 4C, and may drive the timer 410 for immediately cutting off standby power or directly drive the circuit breaker 420 at other times. Furthermore, as in FIG. 4D, after checking the user's TV model, the cutoff service provision server 300 may guide the user to make a change when it is a set-top free available model.

The items not described in conjunction with the method of providing a set-top box standby power cutoff service shown in FIGS. 2 to 4D are the same as or easily inferred from those described in conjunction with the method of providing a set-top box standby power cutoff service shown in FIG. 1. Accordingly, the descriptions thereof will be omitted below.

FIG. 5 is a diagram illustrating a process of transmitting and receiving data between components included in the system for providing a set-top box standby power cutoff service shown in FIG. 1 according to an embodiment of the present invention. Hereinafter, an example of a process in which data is transmitted and received between the individual components will be described with reference to FIG. 5, but the present application is not limited to the embodiment. It is obvious to those skilled in the art that the process of transmitting and receiving the data shown in FIG. 5 may be modified according to various embodiments described above.

Referring to FIG. 5, the cutoff service provision server maps and stores the user terminal and the set-top box in step S5100, and maps and stores the address input by the user terminal and the GPS location in step S5200.

In addition, the cutoff service provision server transmits a driving signal to the AP to drive the timer of the set-top box when the location of the user terminal is not the location corresponding to the GPS location corresponding to the address in step S5300.

The order of the above-described steps S5100 to S5300 is only an example, and is not limited thereto. That is, the order of the above-described steps S5100 to S5300 may be changed, and some of the steps may be simultaneously executed or deleted.

The items not described in conjunction with the method of providing a set-top box standby power cutoff service shown in FIG. 5 are the same as or easily inferred from those described in conjunction with the method of providing a set-top box standby power cutoff service shown in FIGS. 1 to 4D. Accordingly, the descriptions thereof will be omitted below.

The method for providing a set-top box standby power cutoff service according to an embodiment described with reference to FIG. 5 may be implemented in the form of a storage medium including instructions executable by a computer such as an application or program module executed by a computer. Computer readable media may be any available media that can be accessed by a computer, and includes both volatile and nonvolatile media, removable and non-removable media. Furthermore, the computer readable media may include all computer storage media. Computer storage media includes volatile and nonvolatile, and removable and non-removable media implemented in any method or technology for storage of information such as computer readable instructions, data structures, program modules or other types of data.

The above-described method for providing a set-top box standby power cutoff service according to an embodiment of the present invention is executed by an application basically installed in the terminal (which may include a program included in a platform or operating system basically loaded in the terminal), and may be executed by an application (i.e., a program) directly installed in the master terminal by a user through an application provision server such as an application store server, or a web server related to an application or a corresponding service. In this sense, the above-described method for providing a set-top box standby power cutoff service according to an embodiment of the present invention may be implemented as an application (i.e., a program) that is basically installed in a terminal or directly installed by a user, and may be recorded on a storage medium readable by a computer such as a terminal.

The above description of the present invention is intended for illustrative purposes, and those skilled in the art will understand that it may be easily modified into other specific forms without changing the technical spirit or essential features of the present invention. Therefore, the embodiments described above should be understood as illustrative and not limitative in all respects. For example, each component described as having a single form may be implemented in a distributed form, and similarly, components described as being disposed in a distributed form may be implemented in a combined form. The scope of the present invention is defined by the following claims rather than the detailed description above, and all changes or modifications derived from the meanings and scopes of the claims and equivalent concepts should be construed as being included in the scope of the present invention.

The invention claimed is:

1. A set-top box comprising:
a timer configured to count a preset time after switching to a standby state;
a circuit breaker configured to cut off standby power when there is no input signal and the set-top box is not in operation after an elapse of the preset time counted by the timer; and
a mode switching unit configured to, after switching to the standby state and before driving the timer, allow the set-top box to enter a passive standby mode, in which a central processing unit (CPU) of the set-top box operates in a low-power mode, during the standby state, activate a network interface in the low-power mode, and, when a set-top box update occurs in the low-power mode, switch the CPU, operating in the low-power mode, to an activation mode to perform the update, and then switch the CPU from the activation mode to the low-power mode when the update is completed,
wherein when the set-top box update is required, a length of a control protocol header is calculated by calculating variable optional fields so that only meaningful part is interpreted and processed without a need to interpret an overall message protocol, thereby enabling the set-top box to be updated by simplifying protocol interpretation and processing, even when the CPU is in the low-power mode.

* * * * *